United States Patent Office 3,163,628
Patented Dec. 29, 1964

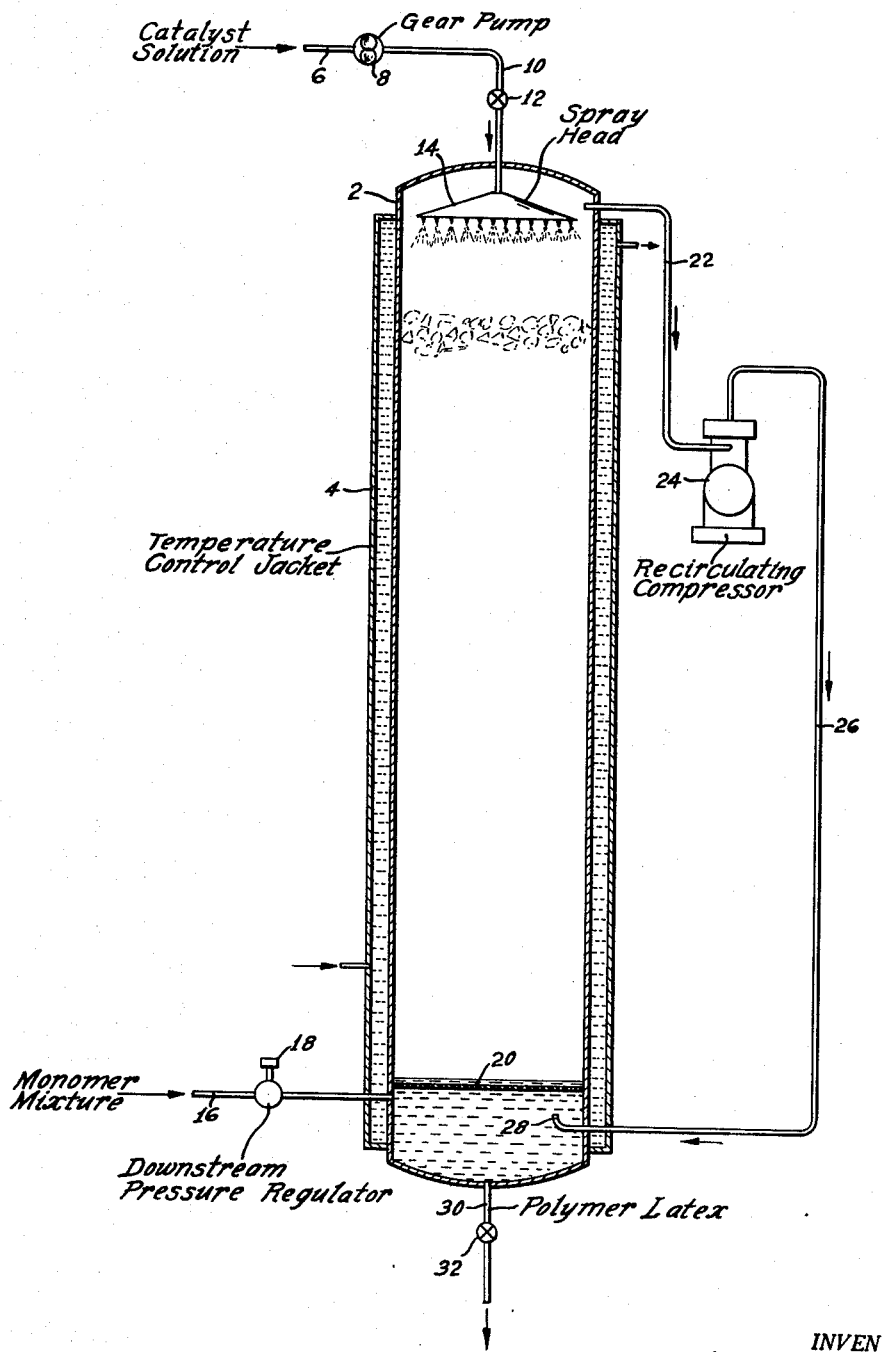

3,163,628
POLYMERIZATION PROCESS FOR UNSATURATED FLUOROOLEFINS
Archibald N. Bolstad, Afton, Minn., assignor, by mesne assignments, to Minnesota Mining and Manufacturing Company, St. Paul, Minn., a corporation of Delaware
Continuation of application Ser. No. 475,385, Dec. 15, 1954. This application Feb. 28, 1961, Ser. No. 92,388
7 Claims. (Cl. 260—87.5)

This invention relates to a method of polymerizing one or more monomers at a constant pressure which is below the saturation pressure of the monomer or at least one of the comonomers being polymerized.

In this invention, by saturation pressure is meant the pressure at which the monomer or monomers being polymerized condense at a specific temperature of reaction. In polymerization reactions, the pressure employed determines to a great extent the rate of polymerization, the temperature determines the dilute solution viscosity, or the molecular weight, of the polymeric product, and the monomer feed composition determines the composition of the polymeric product.

Heretofore, when polymerizing two or more monomers having different reactivities in the liquid phase or under autogenous conditions of pressure to produce a copolymer or terpolymer of a certain specific composition, it has been necessary to first calculate the monomer reactivity ratios, to limit the conversion below a certain maximum percentage, and to use incremental feeding of monomers to obtain the desired results.

The process of the present invention, on the other hand, produces a copolymer or terpolymer having a composition practically identical with the feed composition, especially when the monomers are substantially in the vapor phase. Deviations which are sometimes encountered are possibly accounted for by undesirable side reactions. The monomer mixture to be fed into the polymerization or reaction zone, in one embodiment of the present invention, is prepared in a steel cylinder and is in the liquid phase. In order to insure that the feed charged to the reaction zone is of a composition which will result in a copolymer or terpolymer having the desired composition, it is sometimes necessary to add an estimated excess of one or more of the monomers to the mixture of monomers in the steel cylinder. This excess is to compensate for differences in volatility of the monomers. The vapor above the liquid monomer mixture in the feed tank will be richer in the more volatile monomer. An excess of one or more of the monomers is also desirable in some cases to compensate for the slight quantity of monomer or monomers consumed in side reactions. Usually a preliminary run will suffice to provide the necessary information to make an accurate estimate of the quantity of excess monomer or monomers which should be added to the monomer feed mixture.

The process of the invention produces homogeneous copolymers, terpolymers, and the like, and more efficient use of monomers is obtained with conversions approaching 100 percent, if desired. The process is therefore highly economical as compared to the processes of the prior art.

The molecular weight, as determined by the dilute solution viscosity of the polymer product, can be controlled by regulating the temperature of polymerization. The pressure also affects the molecular weight of the product but only up to a certain maximum pressure, above which an increase in pressure has no effect upon the molecular weight. Modifiers such as chloroform and carbon tetrachloride are not necessary to control the molecular weight of the product, using the process of the present invention.

The constant pressure method of the invention is also easily adapted to continuous operation in equipment having no moving parts. A large safey factor is also involved, since homopolymerization of a single monomer or polymerization between two or more monomers is controlled so that there is never a large amount of monomer or monomers present in the reaction zone, whereby a sudden and uncontrollable reaction of large amounts of material is avoided. The safety of the operation is linked to the control factor of the process, the temperature and pressure being easily regulated and maintained constant.

The polymers of the invention may be prepared in various monomer ratios, when more than one monomer is used, and by employing the various conventional polymerization recipes. The temperatures employed in the polymerization reaction may be between about 0° C. and 100° C. with the preferred temperature range being between about 5° C. to 50° C. The polymers of the invention are prepared using one of a number of free radical promoted polymerization systems. Peroxy-type polymerization promoters have been found to be suitable in initiating desired polymerization reactions and are used in suspension or emulsion polymerization systems.

Of the water suspension-type catalyst systems which may be used, the redox catalyst system is preferred, comprising an oxidant and a reductant. The oxidant in the water suspension-type recipe is preferably an inorganic persulfate, such as potassium persulfate, sodium persulfate, or ammonium persulfate. The reductant is preferably a bisulfite, such as potassium bisulfite, sodium bisulfite, potassium metabisulfite, or sodium metabisulfite. The oxidant in the suspension redox recipe comprises between about 0.1 and 5 parts by weight per 200 parts of water present and preferably comprises between about 0.5 and 2 parts by weight per 200 parts of water present. The reductant, such as sodium metabisulfite, may comprise between about 0.05 and about 5.0 parts by weight per 200 parts by weight of water present and preferably comprises between about 0.1 and 2 parts by weight per 200 parts by weight of water present. A buffer such as sodium tetraborate may be used, if desired, together with the oxidant and reductant.

Also about 0.01 to about 0.2 part by weight per 200 parts by weight of water present of a variable valence metal salt may be used. The variable valence metal salt is preferably an iron salt such as ferrous sulfate or ferrous nitrate, and it is used as an activator. When producing the polymers of the invention in the persulfate-bisulfite suspension system, it is preferable to operate at a temperature range of about 25° C. to about 60° C., but lower temperatures, i.e. between about 5° C. and 25° C., are desirably employed when a variable valence metal salt is present in the polymerization system. Also, the reductant and/or the variable valence metal salt may be eliminated, if desired.

Alternatively, an emulsion catalyst system containing water, soap and a peroxy compound may also be used. The different types of emulsion systems may be conveniently differentiated on the basis of the catalyst system used to initiate the polymerization system. One type is that in which the polymerization is initiated using a redox catalyst system comprising between about 0.01 to about 1 part by weight per 200 parts of water present of an organic oxidant and an activator solution. Exemplary of the organic oxidants which may be used in the emulsion catalyst system are cumene hydroperoxide, diisopropylbenzene hydroperoxide, triisopropylbenzene hydroperoxide, methylcyclohexane hydroperoxide, tertiary-butyl perbenzoate, and tertiary-butyl hydroperoxide. A typical activator solution may consist of about 0.01 to 1.0 part by weight per 200 parts of water present of a variable valence metal salt such as ferrous sulfate, about 0.1 to 10 parts by weight of sodium pyrophosphate, and about 0.1 to 10 parts by weight of a reducing sugar such as dextrose.

Another type of emulsion catalyst system is that which comprises about 0.05 to 5 parts by weight per 200 parts of water present of a persulfate as the oxidant, and which preferably comprises between about 0.1 and about 0.5 part by weight of any of the persulfates previously mentioned as being suitable for use in aqueous suspension systems.

The soap employed as the emulsifying agent in either the redox or persulfate emulsion catalyst systems is preferably a metal salt, such as the potassium or sodium salt, derived from saturated aliphatic acids, the optimum chain length of the acid being between about 14 and about 20 carbon atoms, or from polyfluorocarboxylic acids or perfluorochlorocarboxylic acids. The polyfluorocarboxylic acids which may be used are those disclosed in U.S. Patent No. 2,559,752, and the derivatives of the acids disclosed therein as being efficacious dispersing agents in polymerization reactions may also be employed in the process of the present invention. The perfluorochlorocarboxylic acids which may be used in the process of the present invention are those disclosed in copending application Serial No. 463,073, filed October 18, 1954, now U.S. Patent No. 2,874,152, as being useful as dispersing agents in polymerization reactions. The soap is generally present in a quantity between about 0.5 and about 10 parts by weight per 200 parts of water present. The emulsion polymerization is desirably conducted under alkaline conditions, and the pH should be maintained between about 9 and 11 in order to prevent gelling of the soap. The pH may be adjusted, if desired, by the addition of suitable buffers.

The process of the invention may be operated at pressures in the range of atmospheric pressure to about 500 p.s.i.g., the pressure which is employed in any specific reaction being determined by the volatility of the monomer or monomers to be reacted. The reaction time may be in the range of about 0.1 to 72 hours.

Monomers which may be copolymerized according to the process of the present invention may be divided into the following groups, the division being made on the basis of the boiling points of the monomers. The maximum pressures given are those below which the monomers will be in the vapor phase at room temperature, i.e. 25° C., and above which the monomers will begin to condense, i.e. the saturation pressure. The minimum pressures given are those which are necessary to obtain substantial amounts of polymer product.

| Group: Relative Volatility | Boiling Point of Monomers | Max. Pressure at Room Temp. | Minimum Pressure |
| --- | --- | --- | --- |
| 1 | Most | −180 to −40° C | 500 p.s.i.g | 50. |
| 2 | Less | −40 to −10° C | 75 p.s.i.g | 25. |
| 3 | Least | −10 to R.T. (25° C.) | 40 p.s.i.g | Atmospheric. |

Illustrative examples of monomers in each of these three groups are as follows:

Group 1.—Vinylidene fluoride, trifluoroethylene, tetrafluoroethylene, vinyl fluoride, ethylene, and propene.

Group 2.—Chlorotrifluoroethylene, vinyl chloride, 1,1-chlorofluoroethylene, 2,3,3,3-tetrafluoropropene-1, perfluoropropene, 3,3,3-trifluoropropene-1, and 1,1,3,3,3-pentafluoropropene.

Group 3.—1,1-dichloro-2,2-difluoroethylene, vinylidene chloride, bromotrifluoroethylene, 2-chloropentafluoropropene, vinyl bromide, isobutene, 1-chloro-2,2-difluoroethylene, perfluoroacrylonitrile, 2-chloropentafluoropropene, perfluoroisobutene, butadiene and fluoro-1,3-dienes such as perfluorobutadiene, 1,1,2,4,4-pentafluorobutadiene; 1,1,2,4-tetrafluorobutadiene; 1,1,2-trifluorobutadiene; 1,1,3-trifluorobutadiene; 1,1-difluorobutadiene; and, fluoroprene.

The process also includes polymerization of two or more monomers at a constant pressure which is below the saturation pressure of at least one of the monomers but which is above the vapor pressure of one of the monomers at a specific temperature of reaction. In this embodiment of the invention, the composition of the copolymer produced from a given feed mixture of 2 monomers will not be as close to the composition of the feed as in the case where both monomers are copolymerized below their saturation pressures at a specific reaction temperature. However, in addition to the other advantages inherent in this invention, the copolymerization of monomers wherein the vapor of one of the monomers is in contact with a liquid comonomer, leads to copolymers containing a higher mol percentage of the less reactive monomer, as compared with the amount which is incorporated in to the polymeric product when autogenous pressure is used. This advantage is particularly important when copolymerizing monomers such as $CF_2=CFCl$ and $CF_2=CH_2$ with relatively reactive monomers such as chloroprene and styrene. Typical examples of monomers which are included within this embmodiment of the invention are those whose boiling points are above 25° C. at atmospheric pressure, such as styrene, phenyltrifluoroethylene, vinylidene chloride, 2,3-dichlorohexafluorobutene-2, chloroprene, acrylonitrile, alpha-trifluoromethyl-acrylonitrile, butyl acrylate, vinyl carboxylates such as vinyl acetate, etc.; vinyl ethers such as vinyl ethyl ether, vinyl isobutyl ether and vinyl 2-chloroethyl ether; and fluoro-1,3-dienes and such as 1,1-difluoro-2-methylbutadiene, 1,1-difluoro-3-methyl-butadiene and 1,1,3-trifluoro-2-methyl-butadiene.

Whenever conditions permit, it is preferable to copolymerize both monomers below their saturation pressures with in the temperature ranges mentioned in the disclosure.

For example, vinylidene chloride, whose boiling point is 32° C., may be copolymerized while substantially in the vapor phase by employing slightly elevated temperatures at atmospheric pressure and/or by using a feed containing a low concentration of vinylidene chloride.

The pressure ranges given in the above table for each group apply to the copolymerization of monomers within the same group, and when copolymerizing monomers of two different groups, revision of the maximum pressures given in the table above may be required. For example, a feed mixture consisting of any molar percentage combination of trifluoroethylene and vinylidene fluoride or tetrafluoroethylene may be polymerized while in the vapor phase at room temperature at pressures up to 500 p.s.i.g. and preferably not higher than 300 p.s.i.g. to produce a copolymer having about the same composition as that of any specific feed used. When copolymerizing equimolar quantities of trifluoroethylene with chlorotrifluoroethylene or 1,1-chlorofluoroethylene, however, the polymerization pressure should not be in excess of 140 p.s.i.g. at 25° C., and when copolymerizing the monomers of a feed mixture consisting of 25 mol percent of trifluoroethylene and 75 mol percent of chlorotrifluoroethylene or 1,1-chlorofluoroethylene, the polymerization pressure should not be in excess of 100 p.s.i.g. From the foregoing, it will be seen that as the molar percentage in the feed of the less volatile monomer is increased with respect to the molar percentage of the more volatile monomers, the maximum pressure will necessarily have to be decreased.

The process of the invention may be operated with the monomer or monomers being completely in the vapor phase, but it is desired at all times to maintain at least one of the monomers being polymerized substantially completely in the vapor phase. When polymerizing a mixture of two or more monomers, the pressure in the polymerization zone may be such that one monomer is substantially completely in the vapor phase and the other monomer may be substantially completely in the liquid phase. Generally, the monomer or monomers will be substantially completely in the vapor phase, although an equilibrium always exists between the monomers in the vapor phase and the monomers in solution in the aqueous catalyst phase.

In one method of producing polymers according to the process of the invention, a polymerization bomb is charged with a catalyst solution, evacuated, and connected to a cylinder containing a monomer or mixture of monomers, the cylinder being connected to the bomb by means of a conduit having a needle valve therein. The feed is then introduced into the bomb through the needle valve at a controlled rate sufficient to maintain the pressure of polymerization at a desired constant value. Agitation of the contents of the bomb is provided by rocking the system, and the bomb may be heated, if desired.

At the end of the polymerization period, the feed of the monomer or monomers to the bomb is discontinued, and the product is removed in the form of a latex which is then coagulated with an electrolyte or by freezing. The product is then washed and dried to obtain the desired polymer product.

Referring to the accompanying drawings, one embodiment of an apparatus is shown which is useful for producing polymers, according to the process of the present invention, on a commercial scale. The apparatus consists of a vertically elongated vessel 2, which may be fabricated from any non-corrosive material such as stainless steel or the like, having a jacket 4 thereon. Any suitable heat exchange medium may be passed through the jacket for the purpose of controlling the temperature of polymerization within the vessel 2. A conduit 6 connects to a catalyst solution storage, not shown, and with a proportioning gear pump 8 which pumps the aqueous solution through the conduit 10, the valve 12, and the spray head 14 mounted in the top of the elongated vessel 2. The spray head uniformly distributes a fine spray of the aqueous catalyst solution downwardly through the elongated vessel or polymerization reactor, where it contacts rising monomer vapor or vapors introduced through the conduit 16 and the pressure regulator 18 into the bottom of the elongated reaction vessel 2 from a monomer storage, not shown. The monomer or monomers are flashed as vapors from the pressure regulator 18 below the foraminous plate 20 mounted in the bottom of the vessel 2, the plate uniformly distributing the monomer vapors throughout the cylindrical reaction vessel 2. A conduit 22 connects the vapor space, or upper portion of the reaction vessel 2, with the suction side of a recirculating compressor 24 and a conduit 26 is connected to the discharge side of the recirculating compressor, terminating at a point 28 below the foraminous plate 20. A conduit 30 having a valve 32 therein is provided for withdrawal of polymer latex product from the bottom of the vertically elongated reaction vessel 2.

If desired, the tower 2 may be packed with any conventional packing such as broken stone, clay spheres, Carborundum, glass rings, porcelain saddles, porcelain rings, and the like.

In the operation of this apparatus, the reaction vessel 2 is brought to the desired temperature by means of a heat transfer medium circulating through the jacket 4, and an aqueous catalyst solution is introduced through the spray head 14 by means of the gear pump 8. As the spray of aqueous catalyst system descends through the reaction vessel 2, it is met by an upflowing stream of monomer or monomers introduced through the conduit 16, the pressure regulator 18, and the dispersing foraminous plate 20. As the aqueous catalyst solution collects in the bottom of the vessel 2, the level of the liquid rises until the foraminous plate 20 is covered, and additional catalyst may be introduced continuously or intermittently. The monomers are introduced at a rate sufficient to maintain the pressure within the vessel constant, and monomers from the vapor space are recirculated through the conduit 22, the recirculating compressor 24, and the conduit 26 in order to maintain the monomer system at a constant composition. As the latex polymer product forms, it may be withdrawn from the system through the conduit 30 and valve 32 at the bottom of the reaction vessel.

Thus, by correlating the feed of catalyst solution, the feed of monomer or monomers, and the withdrawal of the polymer product, the reaction may be operated continuously in the apparatus shown with sufficient monomer or monomers being added at all times to maintain the pressure within the reactor 2 constant and by adding sufficient catalyst, preferably continuously, to make up for that lost in the withdrawal of the polymer latex product. The pressure within the vessel 2 is maintained at all times below the saturation pressure of at least one of the monomers being polymerized so that at least one of the monomers exists substantially completely in the vapor phase, although the monomer is being recirculated through the aqueous catalyst solution and some monomer is dissolved therein at all times.

This type of tower produces many advantages, since no moving parts are involved, and a better contact between the catalyst solution and the monomer or monomer mixture is obtained. Hazards are also reduced due to the fact that the quantity of monomer or monomers present in the polymerization zone is small at all times. Also, low operating pressures may be used, for example, pressures in the range of atmospheric to 150 p.s.i.g.

The invention will be further illustrated by reference to the following specific examples in which all parts are by weight:

EXAMPLE 1

*Preparation of Copolymer Containing 50 Mol Percent of Each of 1,1-Chlorofluoroethylene and Tetrafluoroethylene Employing the Constant Pressure Technique*

The following emulsion redox polymerization system was used:

|  | Parts by weight |
|---|---|
| Water, deionized | 200.0 |
| Potassium persulfate | 1.0 |
| Sodium metabisulfite | 0.4 |
| Ferrous sulfate | 0.1 |
| Perfluorooctanoic acid | 1.0 |

A stainless steel polymerization bomb was charged with the following catalyst solutions, freezing the contents in a solid carbon dioxide-acetone bath after each addition:

(1) 150 parts of water containing 1 part of dissolved perfluorooctanoic acid,
(2) 30 parts of water containing 1 part of dissolved potassium persulfate,
(3) 10 parts of water containing 0.1 part of ferrous sulfate heptahydrate, and
(4) 10 parts of water containing 0.4 part of sodium metabisulfite.

The bomb was then evacuated and connected to a steel cylinder equipped with a pressure gauge and a needle valve located between the bomb and the steel cylinder. The steel cylinder contained a mixture of monomers consisting of a quantity of 1,1-chlorofluoroethylene and tetrafluoroethylene, in the liquid phase, calculated to provide a feed containing 50 mol percent of each monomer, or a feed containing 22.3 parts of 1,1-chlorofluoroethylene and 27.7 parts of tetrafluoroethylene. The needle valve between the steel cylinder and the polymerization bomb was opened and the feed was introduced into the bomb in the gaseous phase at a rate sufficient to maintain the pressure of polymerization at 50 p.s.i.g. The entire system was rocked at ambient temperature which was about 25° C. At the end of 21 hours, 50 parts of feed had been introduced into the bomb and the polymerization was then stopped. The product in the bomb was in the form of a white latex. The latex was coagulated with a hot dilute sulfuric acid-sodium chloride solution. The coagulated product was collected, thoroughly washed with warm and cold water, and dried to constant weight in vacuo at a temperature of 35° C. A rubbery polymeric product was obtained in 90 percent conversion, and was found to contain 20.1 percent chlorine, or 50 mol percent of combined 1,1-chlorofluoroethylene and 50 mol percent of combined tetrafluoroethylene.

The above procedure was repeated with the exception that the feed, containing 50 mol percent of 1,1-chlorofluoroethylene and 50 mol percent of tetrafluoroethylene, was introduced into the polymerization bomb at a rate sufficient to maintain the polymerization pressure between 75 and 100 p.s.i.g. After 6.2 hours of polymerization at a temperature of 25° C., the polymerization was stopped. The latex was dried in the same manner as that set forth above and a rubbery product was obtained having approximately the same composition as that of the polymer produced above.

EXAMPLE 2

*Preparation of a Copolymer of 1,1-Chlorofluoroethylene and Tetrafluoroethylene Under Autogenous Conditions of Pressure*

Three runs was conducted in heavy walled glass polymerization tubes using the same recipe of Example 1 above, except that no perfluorooctanoic acid was employed. After the tubes were changed with 200 parts of water, 1.0 part of potassium persulfate, 0.4 part of sodium metabisulfite and 0.1 part of ferrous sulfate heptahydrate, the tubes were evacuated and further charged by flash distillation at liquid nitrogen temperature with 44.6 parts of 1,1-chlorofluoroethylene and 55.4 parts of tetrafluoroethylene, corresponding to a charge containing 50 mol percent of each monomer. After sealing the tubes under vacuum at the temperature of liquid nitrogen, they were rotated end over end in a water bath, the temperature of which was automatically controlled at 20° C. The polymerizations were conducted under autogenous conditions of pressure. At the end of the period indicated in Table 1, the polymerizations were stopped and the tubes were placed in a liquid nitrogen bath to coagulate the products. The coagulated polymeric products were collected, washed several times with water and dried to constant weight in vacuo at a temperature of 35° C. The results of these three runs are given in Table 1, below.

heterogeneous. The product was also a powder, although a rubbery product was expected and desired. The heterogeneity and powdery nature of this product is accounted for by the fact that as the relative concentration of the less reactive monomer, $CF_2=CF_2$, to the more reactive monomer, $CH_2=CFCl$, increases, the $CF_2=CF_2$ is drawn into the reaction to a greater extent. Therefore, the resulting polymer possessed a preponderance of the tetrafluoroethylene monomer unit at either end of the polymer chain, the product thereby assuming the powdery nature of polytetrafluoroethylene. This unevenness of reaction of the two monomers produced the excessive spread of monomer ratios found in the copolymers listed in Table 1 above. The use of constant pressure or feeding the monomers into the reaction zone in the vapor phase and maintaining the polymerization pressure below that which causes condensation of the monomers does not necessitate the calculation, based on reactivity ratios, of a specific molar charge to obtain a product of desired composition.

Also, in order to produce a more homogeneous copolymer when autogenous pressures are used, the conversion must be kept below about 30 percent by weight. On the other hand, the composition and homogeneity of the copolymer produced using the constant pressure technique is independent of conversion and, in general, is dependent only on the composition of the feed, a specific feed of monomer producing a copolymer having the same composition as the feed.

EXAMPLE 3

*Preparation of Copolymer Containing 80 Mol Percent of 1,1-Chlorofluoroethylene and 20 Mol Percent of Tetrafluoroethylene*

The following emulsion redox polymerization recipe was used:

| | Parts by weight |
|---|---|
| Water, deionized | 200.0 |
| Potassium persulfate | 1.0 |
| Sodium metabisulfite | 0.4 |
| Ferrous sulfate | 0.1 |
| $Cl(CF_2—CFCl)_3CF_2COOH$ | 1.0 |
| Citric acid | 0.001 |

TABLE 1

| Run Nos. | Percent Conversion | Reaction Time (Hours) | Composition of Product | | Characteristics |
|---|---|---|---|---|---|
| | | | Mol Percent $CH_2=CFCl$ | Mol Percent $CF_2=CF_2$ | |
| 1 | 54 | 24 | 82 | 28 | Rubbery. |
| 2 | 97 | 23 | 51 | 49 | Powdery (very slightly rubbery). |
| 3 | 8 | 0.3 | 80 | 20 | Rubber. |

Comparison of the results obtained in these three runs with those obtained in Example 1 above points up several of the advantages of using the constant pressure technique of the invention over the ordinary method of contact polymerizations under autogenous conditions of pressure. The reactivities of 1,1-chlorofluoroethylene and tetrafluoroethylene are quite different as disclosed in copending application Serial No. 470,194, filed November 22, 1954, the reactivity ratio of 1,1-chlorofluoroethylene being 2.8+0.3 and the reactivity of tetrafluoroethylene being 0.1+0.1. Thus, no feed containing both of these monomers will yield a copolymer of the same compoistion as the feed when the copolymerization is conducted under autogenous pressure or when the monomers are reacted in the liquid phase. In Run No. 2 of Table 1 above, a 51:49 copolymer of 1,1-chlorofluoroethylene:tetrafluoroethylene was obtained from a 50:50 charge. Although this particular run yielded a copolymer of approximately the same composition as the feed, the product was very A stainless steel polymerization bomb was charged with the following catalyst solutions, freezing the contents in a solid carbon dioxide-acetone bath after each addition:

(1) 150 parts of water containing 1.0 part of dissolved $Cl(CF_2CFCl)_3CF_2—COOH$,
(2) 30 parts of water containing 1.0 part of dissolved potassium persulfate,
(3) 10 parts of water containing 0.4 part of dissolved sodium metabisulfite, and
(4) 10 parts of water containing 0.1 part of dissolved ferrous sulfate heptahydrate and 0.001 part of citric acid.

The bomb was then evacuated and connected to a steel cylinder equipped with a pressure gauge and a needle valve located between the bomb and the steel cylinder. The steel cylinder contained a mixture of monomers containing a quantity of 1,1-chlorofluoroethylene and tetrafluoroethylene in liquid phase calculated to provide a feed containing 80 mol percent of 1,1-chlorofluoroethylene and 20 mol percent of tetrafluoroethylene, or a feed containing 43.9 parts of 1,1-chlorofluoroethylene and 13.5 parts of tetrafluoroethylene. The needle valve between the steel cylinder and the polymerization bomb was opened and the feed was introduced into the bomb in the gaseous phase at a rate sufficient to maintain the pressure of polymerization at 50 p.s.i.g. The entire system was rocked at ambient temperature, which was about 25° C. At the end of 17.6 hours the polymerization was short-stopped after only 6.6 parts of feed had been introduced into the bomb. The product in the bomb was in the form of a white latex. The latex was coagulated with a hot dilute sulfuric acid-sodium chloride solution. The coagulated product was collected, thoroughly washed with warm and cold water, and dried to constant weight in vacuo at a temperature of 35° C. A tacky rubbery polymeric product was obtained and was found to contain 33.18 percent chlorine, or 79 mol percent of combined 1,1-chlorofluoroethylene and 21 mol percent of combined tetrafluoroethylene.

EXAMPLE 4

*Preparation of Copolymer Containing 27 Mol Percent of 1,1-Chlorofluoroethylene and 73 Mol Percent of Tetrafluoroethylene From a 23:77 Molar Feed of Monomers*

Following the general procedure of Example 3 above, a stainless steel polymerization bomb was charged with the same catalyst solution of Example 3 and further charged with a monomer feed containing 14.4 parts of $CH_2=CFCl$ and 60 parts of $CF_2=CF_2$ or a monomer feed containing 23 mol percent of $CH_2=CFCl$ and 77 mol percent of $CF_2=CF_2$. The feed was introduced at a rate sufficient to maintain the pressure within the bomb at 100 p.s.i.g. The bomb was rocked at a temperature of 25° C. (ambient) for a period of 23.3 hours during which time 39 parts of monomers were reacted. The polymeric product was in the form of a fairly firm gel which was filtered, washed with hot dilute hydrochloric acid and then with water. After drying to constant weight in vacuo at a temperature of 35° C., 35.7 parts of a powder were obtained, corresponding to a 90 percent conversion of monomers used to copolymer. Upon analysis, the product was shown to contain 10.0 percent chlorine, corresponding to 27 mol percent of $CH_2=CFCl$ and 73 mol percent of $CF_2=CF_2$. The powdery copolymer was partly soluble in methyl ethyl ketone and not very soluble in tetrahydrofuran, dimethylformamide or acetone.

EXAMPLE 5

*Preparation of a Copolymer Containing 4 Mol Percent of 1,1-Chlorofluoroethylene and 96 Mol Percent of Tetrafluoroethylene From a 2:98 Initial Feed of Monomers*

Following the general procedure of Example 3 above, a stainless steel polymerization bomb was charged with the same catalyst solution of Example 3, and further charged with a monomer feed consisting of 2 mol percent of 1,1-chlorofluoroethylene and 98 mol percent of tetrafluoroethylene. The feed was introduced at a rate sufficient to maintain the pressure within the bomb at 100 p.s.i.g. The bomb was rocked at a temperature of 25° C. (ambient) for a period of 23.3 hours during which time 32.1 parts of monomer were reacted. The polymer latex was coagulated, collected, and the coagulated product was treated as described in Example 1 above. About 32.1 parts of a powder were obtained, the conversion of monomers charged to product being about 100 percent. Analysis for chlorine content showed the copolymer to contain 1.29 percent chlorine, or 4 mol percent of combined 1,1-chlorofluoroethylene and 96 mol percent of combined tetrafluoroethylene.

EXAMPLE 6

*Preparation of a Copolymer Containing About 80 Mol Percent of Vinylidene Fluoride and About 20 Mol Percent of 1,1-Chlorofluoroethylene*

The following emulsion polymerization recipe was used:

| | Parts by weight |
|---|---|
| Water, deionized | 200.0 |
| Potassium persulfate | 1.0 |
| Sodium metabisulfite | 0.4 |
| $Cl(CF_2-CFCl)_3CF_2COOH$ | 1.0 |

A stainless steel polymerization bomb was charged with the following catalyst solutions, freezing the contents in a solid carbon dioxide-acetone bath after each addition:

(1) 150 parts of water containing 1.0 part of dissolved $Cl(CF_2-CFCl)_3-CF_2COOH$,
(2) 30 parts of water containing 1.0 part of dissolved potassium persulfate, and
(3) 20 parts of water containing 0.4 part of dissolved sodium metabisulfite.

The bomb was then evacuated and connected to a steel cylinder equipped with a pressure gauge and a needle valve located between the bomb and the steel cylinder. The steel cylinder contained a mixture of monomers consisting of a quantity of vinylidene fluoride and 1,1-chlorofluoroethylene in the liquid phase, calculated to provide a feed containing 80 mol percent of vinylidene fluoride and 20 mol percent of 1,1-chlorofluoroethylene, or a feed containing 76.1 parts of vinylidene fluoride to 23.9 parts of 1,1-chlorofluoroethylene. The needle valve between the steel cylinder and the polymerization bomb was opened and the feed was introduced into the bomb in the gaseous phase at a rate sufficient to maintain the pressure of polymerization at 140 p.s.i.g. The entire system was rocked at a temperature of 50° C. for a period of 21 hours. The polymer latex was coagulated, collected, washed and dried as described in Example 1 above. A solid product was obtained and was found to contain 8.9 percent fluorine corresponding to a copolymer containing 82 mol percent of vinylidene fluoride and 18 mol percent of 1,1-chlorofluoroethylene.

EXAMPLE 7

*Copolymer of Chlorotrifluoroethylene and Vinylidene Fluoride*

In order to produce a copolymer of chlorotrifluoroethylene and vinylidene fluoride which is to be used as a constituent of a spraying lacquer of excellent grade to be applied as a protective coating on surfaces exposed to strong and corrosive chemicals, it is necessary to control the polymerization conditions so that a copolymer is produced containing between 70 and 80 mol percent chlorotrifluoroethylene and having a dilute solution viscosity value ranging between 0.48 and 0.55 centistoke, preferably between 0.05 and 0.53 centistoke. Such a copolymer should also form a clear solution when 20 parts of it are dissolved in 80 parts of an inexpensive and low boiling organic solvent, such as methyl ethyl ketone, methyl isobutyl ketone, or ethyl butyl ketone. The runs presented in Table 2 below illustrate the use of various polymerization recipes used to copolymerize $CF_2=CFCl$ and $CF_2=CH_2$ under autogenous pressure, or in the liquid phase, in the presence of a modifier such as chloroform. Results of these runs show that when the polymerization is conducted in the liquid phase, it is quite difficult to control the reactions so as to produce a specific composition possessing the desirable properties mentioned above. Comparisons of the results given in Tables 2 and 3 below will shown that copolymerizing the monomers under a constant pressure which is below the saturation pressure of the monomers is an improved and preferable process which can be controlled easily to yield a copolymer having these specific properties.

A series of runs was made using the following polymerization recipe:

| | Parts by weight |
|---|---|
| Water, deionized | 300.0 |
| $CF_2=CFCl$ | } 100.0 |
| $CF_2=CH_2$ | |
| Potassium persulfate | } Variable [1] |
| Sodium metabisulfite | |
| $Cl(CF_2CFCl)_3CF_2COOH$ | |
| Chloroform | 7.5 |
| Ferrous sulfate | 0.05 |

[1] See Table 2.

The general procedure was the same in each run. Potassium persulfate, sodium metabisulfite, ferrous sulfate, and $C_8$-fluorochloro acid were dissolved in aliquots of the 200 parts of water and each solution was charged to a stainless steel polymerization bomb freezing the contents of the bomb in a solid carbon dioxide-acetone bath after each addition. The 7.5 parts of chloroform were then added to the bomb and the bomb was evacuated. A total of 100 parts of a monomer charge, containing $CF_2=CFCl$ and $CF_2=CH_2$ in the mol percent ratio as given to Table 2, were flash distilled into the bomb. The bomb was then closed and rotated end-over-end for the period of time given in Table 2. The polymerization product was coagulated by freezing and the coagulated product was collected, washed, then dried as described in Example 1. The results of six such runs are given in Table 2.

TABLE 2

| Run No. | Composition of Charge, Mol Percent | | Polymerization Recipe Variables (Parts by Weight) | | | Temp., °C. | Percent Conversion Time (Hours) | Composition of Product (Infrared Analysis) Mol Percent | | Dilute Solution Viscosity (cs) [1] | Solution in Methyl Ethyl Ketone [2] |
|---|---|---|---|---|---|---|---|---|---|---|---|
| | $CF_2=CFCl$ | $CF_2=CH_2$ | $K_2S_2O_8$ | $Na_2S_2O_5$ | $C_8$-acid | | | $CF_2=CFCl$ | $CF_2=CH_2$ | | |
| 1 | 75 | 25 | 1.00 | 0.80 | | 15 | 29.4/6 | 69 | 31 | 0.540 | Insoluble. |
| 2 | 75 | 25 | 0.75 | 0.60 | | 14 | 26.8/7 | 69 | 31 | 0.552 | Do. |
| 3 | 72 | 28 | 0.75 | 0.60 | | 15 | 4.0/8 | 67 | 33 | 0.609 | Do. |
| 4 | 72 | 28 | 0.75 | 0.60 | | 16 | 32.3/5.5 | 66 | 34 | 0.564 | Soluble. |
| 5 | 72 | 28 | 1.00 | 0.80 | 0.373 | 20 | 26.7/9 | 66 | 34 | 0.592 | Insoluble. |
| 6 | 77 | 23 | 0.75 | 0.60 | 0.500 | 14 | 12.0/17.5 | 73 | 27 | | Do. |

[1] 0.75 percent solution viscosity in a 3,5-dichlorobenzotrifluoride solvent at a temperature of 266° F.
[2] 20 parts of copolymer in 80 parts of methyl ethyl ketone.

EXAMPLE 8

The following experiment illustrates the advantageous use of the constant pressure technique of copolymerizing $CF_2=CFCl$ and $CF_2=CH_2$ at a pressure below the saturation pressure of the monomers.

The following polymerization recipe was employed:

| | Parts by weight |
|---|---|
| Water, deionized | 200.0 |
| Potassium persulfate | 1.0 |
| Sodium metabisulfite | 0.4 |
| $Cl(CF_2CFCl)_3CF_2COOH$ | 1.0 |

A series of stainless steel polymerization bombs was charged with 150 parts of water containing 1.0 part of the $C_8$-fluorochloro acid, 30 parts of water containing 1.0 part of dissolved potassium persulfate, and 20 parts of water containing 0.4 part of dissolved sodium metabisulfite. The contents of the bombs were frozen, after each addition, in a bath consisting of solid carbon dioxide and acetone. The bombs were then evacuated and each was connected to a steel cylinder containing 75 mol percent of $CF_2=CFCl$ and 25 mol percent of $CF_2=CH_2$. The monomer feed was introduced into each bomb at a rate sufficient to maintain polymerization pressure at 141 p.s.i.g. at a temperature of 75° C. for the periods of time given in Table 3 below. The steel cylinders were then disconnected and the bombs were vented to atmospheric pressure. The contents of each bomb were poured into 100 parts of water containing 5 parts of methanol in order to short-stop the polymerization reaction. Each polymer latex was coagulated, collected, washed and dried as described in Example 1 above. In each run the percentage of monomers which was converted to copolymers was better than 85 percent.

The results are given in the following Table 3.

TABLE 3

| Run Nos. | Time (Hours) | Polymer Composition | | Dilute Solution Viscosity (cs) [1] | Solubility (20%, MEK) [2] |
|---|---|---|---|---|---|
| | | Mol Percent $CF_2=CFCl$ | Mol Percent $CF_2=CH_2$ | | |
| 1 | 2 | 72.8 | 27.2 | 0.520 | Soluble. |
| 2 | 1 | 71.8 | 28.2 | 0.505 | Do. |
| 3 | 3 | 71.0 | 29.0 | 0.505 | Do. |
| 4 | 3 | 72.0 | 28.0 | 0.515 | Do. |

[1] 0.75 percent solution in 3,5-dichlorobenzotrifluoride at a temperature of 266° F.
[2] Methyl ethyl ketone.

EXAMPLE 9

The following example illustrates the fact that conversions up to 95 percent may be obtained of a homogeneous copolymer having approximately the same composition as the monomer feed.

The following polymerization recipe was employed:

| | Parts by weight |
|---|---|
| Water, deionized | 200.0 |
| Potassium persulfate | 1.0 |
| $Cl(CF_2CFCl)_3CF_2COOH$ | 1.0 |

A 2-gallon horizontal stainless steel autoclave was charged with 1000 parts of water containing 30 parts of potassium persulfate and 5000 parts of water containing 30 parts of dissolved $C_8$-fluorochloro telomer acid. The autoclave was then evacuated and brought up to atmospheric pressure by feeding in a monomer charge consisting of 51.6 parts of $CF_2=CFCl$ and 8.4 parts of $CF_2=CH_2$, corresponding to a feed containing 77 and 23 mol percent of $CF_2=CFCl$ and $CF_2=CH_2$, respectively. The feed was then introduced at a rate sufficient to maintain the polymerization pressure at 140 p.s.i.g. at a temperature of 75° C. The polymerization was conducted with vigorous mechanical agitation under these conditions for 3.0 hours, after which time approximately 3900 parts of monomers had been charged. White latex was obtained having a high solids content with very little polymer formation on the walls of the autoclave. The latex was discharged and coagulated by freezing. The coagulated latex was washed thoroughly with cold and hot water, collected and dried to constant weight in vacuo at a temperature of 35° C. About 3700 parts of a fine white powder were obtained; the conversion of monomers charged to monomers reacted to produce the copolymer was about 95 percent.

Infrared analysis of the product showed it to be very homogeneous and to contain 73 mol percent of combined chlorotrifluoroethylene and 27 mol percent of combined vinylidene fluoride. The product had a 0.75 percent solution viscosity value, as determined in a 3,5-dichlorobenzotrifluoride solvent at 266° F., of 0.515 centistoke. The product was pressed to form a very clear and colorless sheet. The product was soluble in methyl ethyl ketone, methyl isobutyl ketone and ethyl butyl ketone.

EXAMPLE 10

*Preparation of a 45:55 Mol Percent*

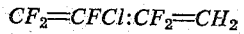

*Copolymer From a 45:55 Mol Percent Monomer Feed*

This example and the following Example 11 are illustrative of the fact that reactivity ratios need not be considered when copolymerizing two monomers of different reactivities, according to the process of the invention.

A stainless steel polymerization bomb was charged with the same polymerization recipe and in the same manner as described in Example 3 above. A monomer feed consisting of 59.8 parts of $CF_2=CFCl$ and 40.2 parts of $CF_2=CH_2$, equivalent to a feed consisting of 45 mol percent of $CF_2=CFCl$ and 55 mol percent of $CF_2=CH_2$, was introduced into the bomb at a rate sufficient to maintain the polymerization pressure at 100 p.s.i.g. at a temperature of 25° C. After rocking the system for 4 hours under these conditions, 54.4 parts of monomers had been charged. The latex was worked up in the same manner as described in Example 1 above and 46.0 parts of a rubbery product was obtained, the conversion being 93 percent. Analysis for fluorine and chlorine content showed the product to contain 45 and 55 mol percent of combined chlorotrifluoroethylene and vinylidene fluoride, respectively.

EXAMPLE 11

The following polymerization recipe was employed:

| | Parts by weight |
|---|---|
| Water, deionized | 200.0 |
| Potassium persulfate | 1.0 |
| Sodium metabisulfite | 0.4 |

A stainless steel polymerization bomb was charged with 100 parts of water containing 1.0 part of dissolved potassium persulfate and 100 parts of water containing 0.4 part of sodium metabisulfite, freezing the contents of the bomb after each addition. The bomb was then charged in the manner described in Example 1 above with a monomer feed containing 12.6 parts of $CF_2=CFCl$ and 62.4 parts of $CF_2=CH_2$ or a feed containing 10 and 90 mol percent of $CF_2=CFCl$ and $CF_2=CH_2$, respectively. The feed was introduced at a rate sufficient to maintain the polymerization pressure at 140 p.s.i.g. at a temperature of 50° C. The entire system was rocked under these conditions for a period of 6.5 hours after which time the polymer latex was treated as described in Example 1, above. A powdery product was obtained in an 86 percent conversion of monomers charged (18.7 parts) to copolymer product (16.0 parts). Chlorine and fluorine analysis showed the product to contain 12 and 88 mol percent of combined chlorotrifluoroethylene and vinylidene fluoride, respectively.

EXAMPLE 12

*Preparation of a Copolymer of Tetrafluoroethylene and Vinylidene Fluoride at a Pressure Below the Saturation Pressure of the Monomers*

A stainless steel polymerization bomb was charged with the same polymerization catalyst system as employed in Example 3 above except that 0.002 part of citric acid was used instead of 0.001 part. The bomb was evacuated and charged with a monomer feed consisting of 25.7 parts of $CF_2=CF_2$ and 49.3 parts of $CF_2=CH_2$ or a feed containing 25 and 75 mol percent of $CF_2=CF_2$ and $CF_2=CH_2$, respectively. The feed was introduced at a rate sufficient to maintain the polymerization pressure at 310 p.s.i.g. at 25° C. for a period of 17 hours after which time 54.7 parts of monomers had been charged to the bomb. The latex was worked up as described in Example 1 above. A powdery product (52.0 parts) was obtained in 95 percent conversion and was found to contain 34 mol percent of combined tetrafluoroethylene and 66 mol percent of combined vinylidene fluoride.

EXAMPLE 13

This example illustrates the homopolymerization of a fluorine-containing monomer, such as vinylidene fluoride, at a pressure below the saturation pressure of the monomer.

A stainless steel polymerization bomb was charged with the same polymerization recipe and in the same manner as described in Example 11 above, and further charged in the same manner described in Example 1 above with vinylidene fluoride in the vapor phase at a rate sufficient to maintain the polymerization pressure in the bomb at 140 p.s.i.g. at a temperature of 50° C. The entire system was rocked under these conditions for a period of 2 hours. All of the polymer product was easily collected by filtration, and the filtered powdery material was washed thoroughly with water and dried to constant weight in vacuo at a temperature of 35° C. The powdery polymeric product contained 59.04 percent fluorine (theoretical fluorine content is 59.38 percent) and was obtained in an 80 percent conversion.

A good yield of polyvinylidene fluoride was also obtained using the recipe of Example 12 above and feeding vinylidene fluoride into the polymerization bomb at a rate sufficient to maintain the polymerization pressure at 400 p.s.i.g. at a temperature of 25° C. for 16.5 hours.

EXAMPLE 14

*Homopolymerization of Chlorotrifluoroethylene at a Pressure Below the Saturation Pressure of the Monomer*

The following polymerization recipe was used:

| | Parts by weight |
|---|---|
| Water, deionized | 300.0 |
| Potassium persulfate | 2.4 |
| $Cl(CF_2CFCl)_3CF_2COOK$ | 2.4 |
| Sodium orthophosphate (buffer) | 2.4 |

A stainless steel polymerization bomb was charged with the following ingredients, freezing the contents of the bomb in a solid carbon dioxide-acetone bath after each addition:

(1) 95 parts of a neutral aqueous solution containing 2.4 parts of the potassium salt of $C_8$-fluorochloro telomer acid, and (2) 45 parts of an aqueous solution containing 2.4 parts of potassium persulfate.

The pH of the mixture was then adjusted to 8.5 by the addition of potassium hydroxide, and then 160 parts of water containing 2.4 parts of dissolved sodium orthophosphate ($Na_2HPO_4 \cdot 12H_2O$) were added. The bomb was then evacuated and a feed of chlorotrifluoroethylene was introduced at a rate sufficient to maintain the polymerization pressure at 70 p.s.i.g. The polymerization was conducted for 19 hours at 70 p.s.i.g. and at a temperature of about 25° C. The final pH of the system was 7.8. The polymer latex contained a high solids content and was coagulated by freezing. The coagulated product was easily removed from the bomb and was washed thoroughly with cold and then warm water and dried to constant weight at a temperature of 190° C. The product was obtained in about a 70 percent conversion, and had a dilute solution viscosity value of 0.924 centistoke which is equivalent to an N.S.T. of 270° C.

EXAMPLE 15

The following polymerization recipe was used:

| | Parts by weight |
|---|---|
| Water | 200.0 |
| Potassium persulfate | 1.0 |
| $Cl(CF_2CFCl)_3CF_2COOH$ | 10.0 |

A polymerization tube was charged with 50 parts of water containing 1.0 part of potassium persulfate and 150 parts of water containing 10 parts of dissolved $C_8$-fluorochloro telomer acid. The tube was then evacuated and a monomer charge consisting of 58.0 parts of chloroprene and 42.0 parts of vinylidene fluoride, corresponding to a feed containing 50 mol percent of each monomer, was fed to the tube at a rate sufficient to maintain a constant polymerization pressure at 140 p.s.i.g. at a temperature of 40° C. The entire system was rotated end-over-end in a water bath for a period of 19 hours, at the end of which the copolymer latex was coagulated with a sodium chloride-sulfuric acid solution. The coagulated product was washed and dried at constant weight in vacuo at a temperature of 35° C.

The product was a rubbery copolymer obtained in a yield of 16 parts by weight, and chlorine analysis of the product showed it to contain 35.48 percent by weight chlorine corresponding to a copolymer containing 15 mol percent of vinylidene fluoride and 85 mol percent of chloroprene. Fluorine analysis of the product showed it to contain 8.01 percent of fluorine corresponding to a copolymer containing 17.5 mol percent of vinylidene fluoride and 82.5 mol percent of chloroprene.

In contrast to the results obtained in this example, when a monomer mixture containing 50 mol percent of vinylidene fluoride and 50 mol percent of chloroprene was copolymerized in a cumene hydroperoxide redox emulsion system at a temperture of 20° C. for 16 hours under autogenous pressure, only 8 mol percent of vinylidene fluoride was incorporated into the copolymer product.

EXAMPLE 16

Using the same polymerization recipe and charging procedure of Example 14 above, trifluoroethylene is polymerized at a constant pressure of 200 p.s.i.g. at a temperature of 25° C. for a period of 20 hours. The product is worked up as before, and the yield is about 40 parts of trifluoroethylene homopolymer.

EXAMPLE 17

The same polymerization recipe and charging procedure used in Example 14 above is used to polymerize tetrafluoroethylene at a constant pressure of 300 p.s.i.g. and a temperature of 25° C. for a period of 6 hours. The product is worked up before, and the yield is about 55 parts of tetrafluoroethylene homopolymer.

EXAMPLE 18

Using the same polymerization recipe and charging procedure of Example 14 above, 1,1-chlorofluoroethylene is polymerized at a constant pressure of 40 p.s.i.g. at a temperature of 25° C. for a period of 20 hours. The product is worked up as before, and the yield is about 50 parts of 1,1-chlorofluoroethylene homopolymer.

EXAMPLE 19

The same polymerization recipe and charging procedure of Example 14 above is used to copolymerize a monomer mixture containing 30 mol percent of tetrafluoroethylene and 70 mol percent of butadiene at a constant pressure of 75 p.s.i.g. and a temperature of 50° C. for a period of 10 hours. The product is worked up as before and contains between about 20 and 30 mol percent of combined tetrafluoroethylene.

EXAMPLE 20

*Copolymerization at a Pressure Below the Saturation Pressure of One Monomer and Above the Saturation Pressure of the Other*

The polymerization recipe and charging procedure of Example 14 above is used to copolymerize a charge containing 50 mol percent of chlorotrifluoroethylene and 50 mol percent of styrene at a constant pressure of 40 p.s.i.g. and a temperature of 50° C. for a period of 24 hours. The product was worked up as before and contains about 40 mol percent of combined chlorotrifluoroethylene.

It will be obvious to those skilled in the art that many modifications may be made within the scope of the present invention without departing from the spirit thereof, and the invention includes all such modifications.

This application is a continuation of Serial No. 475,385, filed December 15, 1954.

I claim:

1. A continuous copolymerization process comprising continuously charging a mixture of (1) an ethylenically unsaturated fluoroolefinic monomer having not more than about 8 carbon atoms and having at least one fluorine atom attached to a carbon atom of the ethylenically unsaturated monomer nucleus, and (2) a different ethylenically unsaturated copolymerizable monomer having not more than about 8 carbon atoms into the polymerization zone at a rate sufficient to maintain a constant pressure in the polymerization zone, maintaining said polymerization zone at a preselected temperature between about 0° C. and about 100° C., the pressure in the zone being below the saturation pressure of both monomers at said preselected temperature, introducing an aqueous free radical catalyst solution into said polymerization zone, copolymerizing the monomers charged to said polymerization zone, and removing the copolymer product from said polymerization zone.

2. A copolymerization process according to claim 1 in which the monomers are recirculated from the upper portion of the polymerization zone to the lower portion thereof.

3. A copolymerization process according to claim 1 in which the monomers are 1,1-chlorofluoroethylene and tetrafluoroethylene.

4. A copolymerization process according to claim 1 in which the monomers are chlorotrifluoroethylene and vinylidene fluoride.

5. A copolymerization process according to claim 1 in which the monomers are tetrafluoroethylene and vinylidene fluoride.

6. A copolymerization process according to claim 1 in which the monomers are chlorotrifluoroethylene and styrene.

7. A copolymerization process according to claim 1 in which the monomers are chloroprene and vinylidene fluoride.

References Cited in the file of this patent

UNITED STATES PATENTS

| 2,393,967 | Brubaker | Feb. 5, 1946 |
| 2,559,752 | Berry | July 10, 1951 |
| 2,904,409 | Bolstad | Sept. 15, 1959 |

UNITED STATES PATENT OFFICE
CERTIFICATE OF CORRECTION

Patent No. 3,163,628 December 29, 1964

Archibald N. Bolstad

It is hereby certified that error appears in the above numbered patent requiring correction and that the said Letters Patent should read as corrected below.

Column 7, TABLE 1, fifth column, line 1 thereof, for "28" read -- 18 --; column 15, line 66, after "up" insert -- as --; line 73, for "20 hours" read -- 6 hours --.

Signed and sealed this 13th day of July 1965.

(SEAL)
Attest:

ERNEST W. SWIDER
Attesting Officer

EDWARD J. BRENNER
Commissioner of Patents